United States Patent

Parisi et al.

[11] Patent Number: 5,934,361
[45] Date of Patent: Aug. 10, 1999

[54] AUTOMOTIVE HEATING AND AIR CONDITIONING ASSEMBLY WITH IMPROVED AIR FLOW AND TEMPERATURE CONTROL

[75] Inventors: Mark Joseph Parisi, East Amherst; Wayne Oliver Forrest, Gasport, both of N.Y.; Kenneth Lawrence Wardlaw, Southfield, Mich.

[73] Assignee: General Motors Corporation, Detroit, Mich.

[21] Appl. No.: 09/031,275

[22] Filed: Feb. 27, 1998

[51] Int. Cl.[6] ............................. F25B 29/00; B60H 1/00
[52] U.S. Cl. ........................ 165/43; 165/42; 165/103; 454/121; 454/126; 251/901
[58] Field of Search ............................. 165/42, 43, 103; 454/121, 126; 251/901

[56] References Cited

U.S. PATENT DOCUMENTS

| | | | |
|---|---|---|---|
| 4,978,061 | 12/1990 | Ogihara et al. | 236/49.3 |
| 5,154,223 | 10/1992 | Ishimaru et al. | 165/42 |
| 5,162,020 | 11/1992 | Asano et al. | 454/156 |
| 5,243,830 | 9/1993 | Ito et al. | 251/901 |
| 5,326,315 | 7/1994 | Inoue et al. | 454/126 |
| 5,564,979 | 10/1996 | Sumiya et al. | 454/121 |
| 5,632,672 | 5/1997 | Higashihara | 454/121 |
| 5,653,630 | 8/1997 | Higashihara | 454/121 |

FOREIGN PATENT DOCUMENTS

| | | | |
|---|---|---|---|
| 5-141763 | 6/1993 | Japan | 454/126 |
| 5-141764 | 6/1993 | Japan | 454/126 |
| 5-296553 | 11/1993 | Japan | 454/126 |
| 6-74548 | 3/1994 | Japan | 454/121 |

*Primary Examiner*—John K. Ford
*Attorney, Agent, or Firm*—Patrick M. Griffin

[57] ABSTRACT

An improved film type air temperature control valve for an automotive HVAC assembly has a flexible, apertured belt that wraps closely around both faces of a heater core case internal to the HVAC housing. Winding and unwinding of the belt around the heater core case, and across a heater core bypass passage, simultaneously opens up more of the bypass passage as it closes off more of the heater core faces, and vice versa. Because of the close conformance of the belt to and across the heater core faces, both faces of the always hot heater core can be completely closed to direct or indirect air flow, preventing any undesired incidental heating of the air flow.

3 Claims, 5 Drawing Sheets

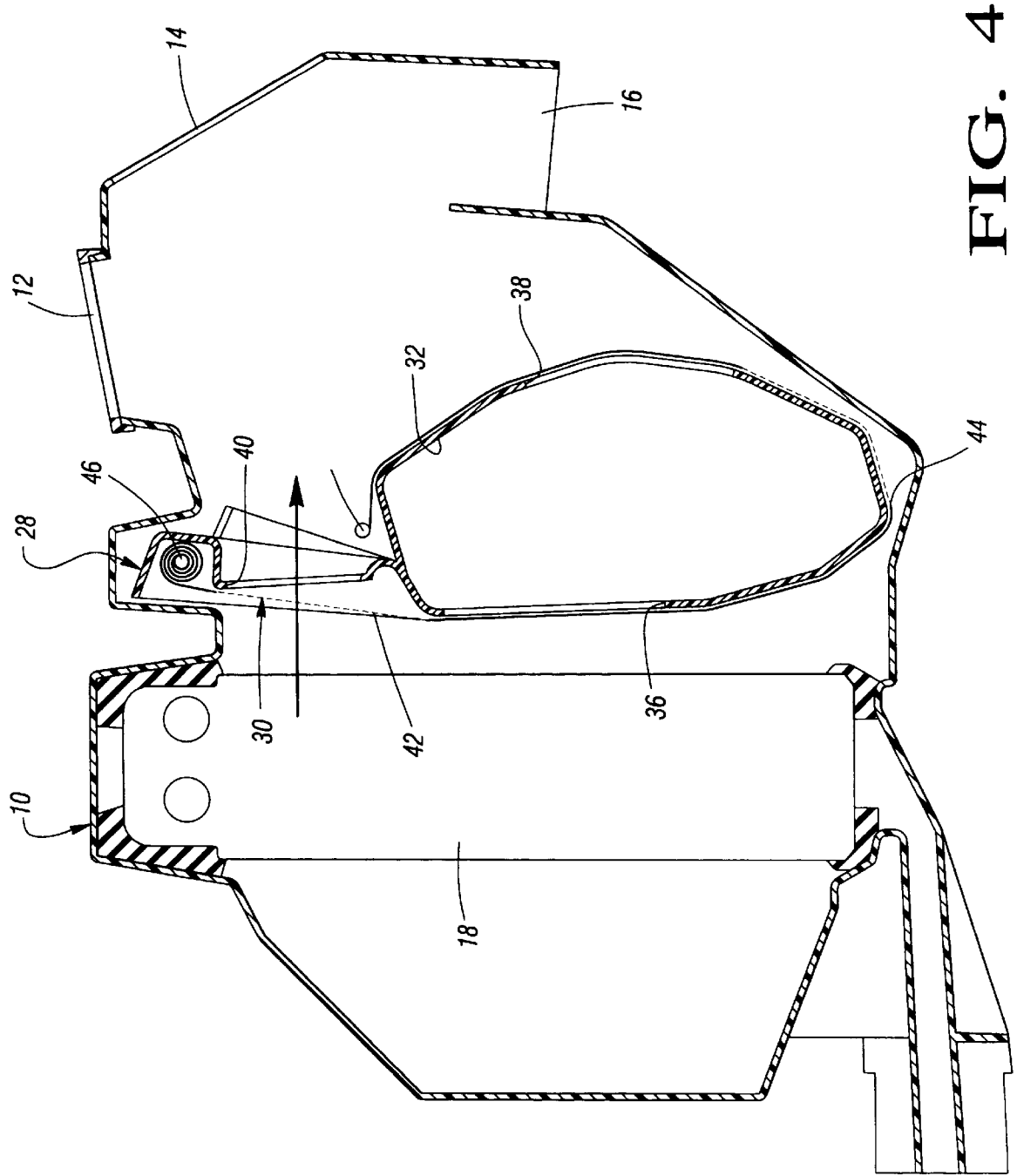

AUTOMOTIVE HEATING AND AIR CONDITIONING ASSEMBLY WITH IMPROVED AIR FLOW AND TEMPERATURE CONTROL

TECHNICAL FIELD

This invention relates to automotive heating and air conditioning assemblies in general, and specifically to such an assembly that improves the air temperature control efficiency by use of a extensible and retractable belt than interacts with the heater core in a novel fashion to better control the air flow through and around the heater core.

BACKGROUND OF THE INVENTION

Heating, ventilation and air conditioning assemblies in automobiles typically include a large, molded plastic housing, often called an HVAC housing, which serves to duct and control forced air flow, as well as to contain various heat exchangers and controls therefor. Three different control systems interact to control air flow through the housing and the temperature thereof. Furthest upstream, a fresh air/recirculated air control determines whether a blower pulls in outside air, or recirculates internal air, or some combination thereof. A greater proportion of recirculated air speeds up the heating or cooling process. Furthest downstream, a so called mode control determines whether forced air is ultimately directed through air outlets upwardly at the windshield, straight forward at the occupant, downward at the feet, or some combination thereof. Between the air inlet and outlet, a pair of separate heat exchangers contained within the housing serve to temper the drawn in air, cooling it, heating it, or both, as determined by a separate temperature control. Typically, all three sets of controls have been simple flapper doors which rotate back and forth to open up or close off various passages and openings, or to direct air flow in one direction or the other, or both. Recently, designs have been proposed which replace the flapper door with a mechanism similar to a window shade, generally called a film valve, that shifts back and forth to cover or uncover various openings and passages. This presents obvious advantages of compactness, and also allows a more finely adjustable opening and closing. Replacement of the downstream air inlet control and of the upstream air outlet control with film valves is fairly straightforward. The intermediate control system used to determine the air temperature presents unique challenges, however, because of the way in which the air flow must be controlled through and around the two heat exchangers involved.

Air temperature is controlled and determined with two heat exchangers carried within the housing, including an evaporator core, which can be turned on and off along with the rest of the air conditioning system, and a heater core, which is generally always activated and hot. The heater core traditionally has diverted engine coolant flowing through it whenever the engine is running, since heater core shut off valves represent an added expense, and also since the heater core can in fact be used in the summer to partially reheat refrigerated air that would otherwise be too cold for the desired interior temperature. The evaporator core typically is large enough in area to fill the entire cross sectional area internal to the housing, and is located downstream of the heater core. Therefore, all forced air passes through the evaporator core first, regardless of whether the evaporator core is activated. This is not a drawback, since the evaporator can be turned off when it is not desired to cool the air. Furthermore, having the evaporator core permanently sitting in the air flow path can present a benefit, even in winter, since it allows outside air to be cooled and dried before being heated, which is useful when defrosting the windshield. On the other hand, having the heater core always active can present a drawback. Known air temperature control systems do not completely isolate or insulate the air flow from the heater core, even when it is not desired to heat the air at all, as when the system is set for rapid cooling. Both older, flapper door temperature valves, and newer, proposed film type temperature valves controls, leave the downstream face of the heater core exposed to the cooled air flow leaving the evaporator core. This is generally true even when the cooled air flow is blocked from flowing directly through the heater core. Air can still flow or "scrub" across the exposed downstream face of the core, picking up some significant heat, when it would be preferable that it pick up little or none.

A good example of a conventional arrangement of evaporator core, heater core, and temperature door can be seen in U.S. Pat. No. 4,978,061, in FIG. 1 of that patent. An upstream evaporator core fills the whole cross sectional area of the housing, while a downstream heater core fills only about half, leaving a bypass passage around the heater core. A flapper door between the two cores moves from a down position, for full cold, to an up position, for full heat, and can also take up intermediate positions to divide the air flow up partially through, and partially around the heater core. In the down, full cold position, the upstream face only of the heater core is covered, and the bypass passage is left fully open. This is enough to block direct air flow through the heater core, but does not cover the downstream heater core face or prevent some of the bypassed air flow from swirling down and "scrubbing" across the exposed heater core back face to pick up some heat. Furthermore, as the door rotates between intermediate angular positions, it is not as precise or "linear" in its division of air flow between the heater core and the bypass passage as would be ideal for the best temperature control. The room needed for a door to swing in an arc also occupies a good deal of housing volume.

Proposed film valve designs for air temperature modulation have the potential for improved compactness and more precise air flow division, but still leave the downstream face of the heater core undesirably exposed to air flow. Examples may be seen in U.S. Pat. Nos. 5,326,316 and 5,162,020. Each uses a film valve to progressively cover or uncover the front face of the heater core, thereby determining how much air flows directly through it. The design disclosed in U.S. Pat. No. 5,564,979 does not use the film belt itself to directly block or unblock the bypass passage around the heater core, using a separate flapper type valve located upstream of the heater core instead. U.S. Pat. No. 5,162,020 does use the film valve to directly open and close the bypass passage, but basically replicates a conventional flapper door by pivoting one edge of a film sheet in front of the heater core and sliding its other edge back and forth, so that the film becomes a traveling leg of a triangle, in effect, moving over approximately the same pattern that a flapper door would follow. Again, neither design blocks the rear face of the heater core. Essentially the converse is disclosed in another patent, U.S. Pat. No. 5,154,223, where a continuous belt is located in front of the downstream face of the heater core, between the heater core and the air outlets, rather than behind the upstream face of the heater core. The heater core sits in a mid point position in the case, defining two bypass passages around the heater core. The one belt does double duty as a temperature control and air outlet control, acting both to progressively block off the downstream face of the heater core, while concurrently opening or closing the bypass passages and the various air outlets. Here, in so called full cold mode, it is the downstream face of the core that is blocked to prevent direct air flow through the heater core, while the bypass passages around the heater core are opened. However, the front face of the heater core instead is exposed straight on to the forced air flow. The only way to prevent the air directly impacting the heater core front face from being substantially heated would be to shut the heater core off with a separate coolant flow shut off valve.

SUMMARY OF THE INVENTION

The invention provides a film type temperature valve that has the capability, with a single flexible belt, to completely cover and block both faces of the heater core, when the full cold mode desired, as well as to directly block the bypass passage and completely open both faces of the heater core when the full hot mode is desired. In addition, at intermediate temperature positions, the belt progressively uncovers the heater core faces while blocking the bypass passage, and vice versa, in inverse proportion, so as to precisely control air flow through the heater core and thereby control the air temperature.

In the preferred embodiment disclosed, an evaporator core and heater core are contained within a hollow housing in a typical configuration, with the evaporator core filling the entire cross section of the housing. The heater core occupies less area, leaving a bypass passage around the side. A flexible belt extends across the bypass passage and wraps closely around both faces of the heater core, running between a pair of rollers that allow it to be extended and retracted. The belt contains a plurality of open windows separated by solid intervals that are sized and oriented relative to the bypass passage and the heater core faces so as to allow them to be selectively opened and closed as the belt extends and retracts. Specifically, in a first limit position of the belt, a so called full cold mode, both faces of the heater core are completely closed and blocked off by solid intervals of the belt, while the bypass passage is registered with a belt window, and fully open. Therefore, no forced air will flow either directly through the heater core, from face to face, or indirectly across either heater core face. At the same time, however, forced air can flow without restriction through the bypass passage. In a second limit position of the belt, a so called full hot position, the converse is true. That is, the bypass passage is totally blocked by a belt solid interval, and both heater core faces are registered with a belt window and completely open to direct flow through of forced air. At any intermediate belt position between the two belt limit positions, the bypass passage is progressively opened, and the heater core faces progressively closed off, or vice versa, in inverse proportion. This allows the air temperature to be closely and precisely controlled.

Additional features of the preferred embodiment disclosed include a heater core module internal to the housing. The module provides both a substantially rigid case for the heater core, and a partition that crosses the bypass passage. Two openings in the heater core case provide for air flow through the heater core, while another opening in the partition provides for bypass air flow. The belt is conveniently mounted to rollers on the module, and slides around and on the rigid portions of the back and front of the heater core case as the belt extends and retracts.

BRIEF DESCRIPTION OF THE DRAWINGS

These and other features of the invention will appear from the following written description, and from the drawings, in which:

FIG. 4 is a view of the heater core and its module installed in the housing, with the belt in full cold position;

DESCRIPTION OF THE PREFERRED EMBODIMENT

Figure 1:
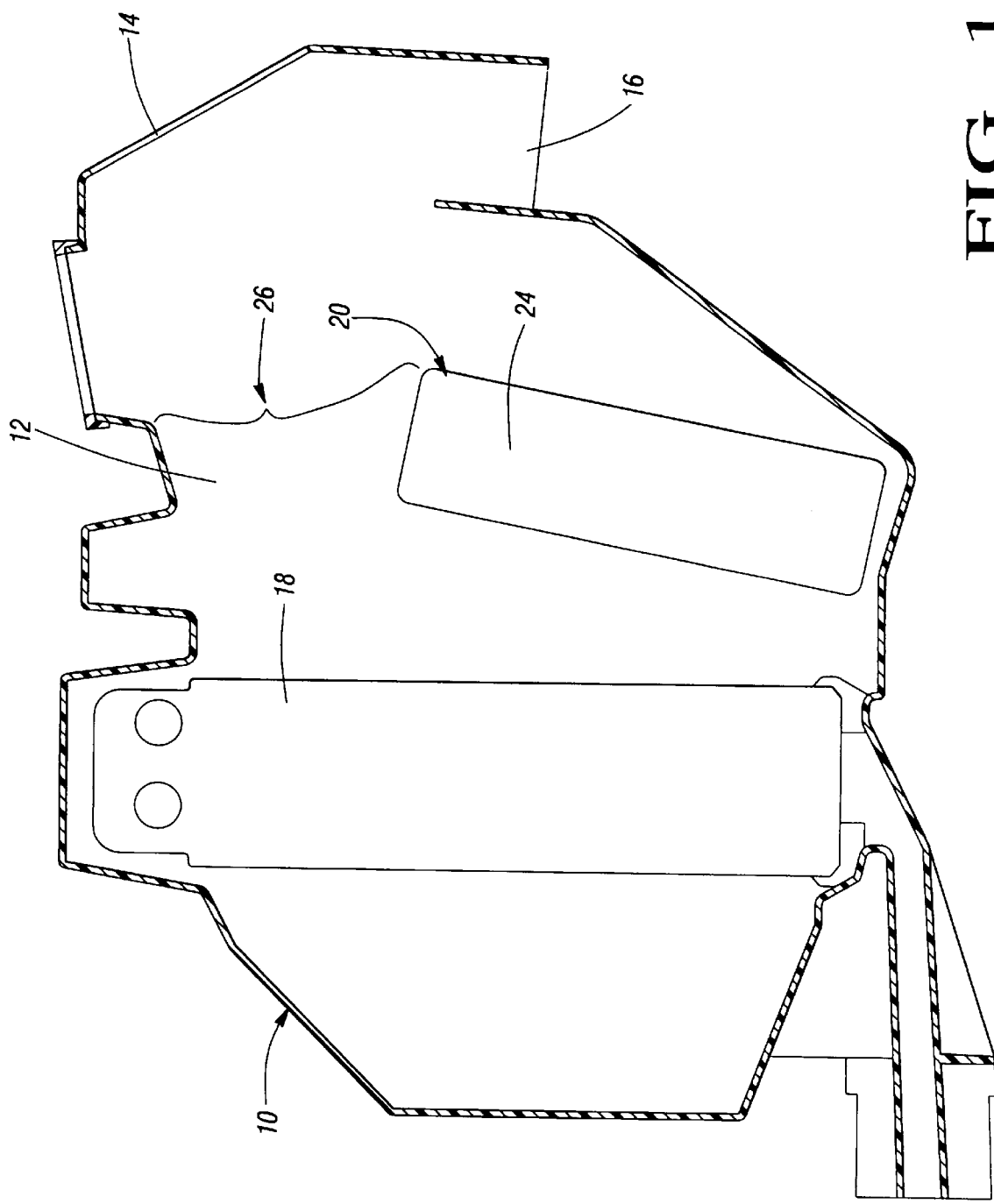
FIG. 1 is a side view showing the inside of a hollow housing, and showing the relative position of an evaporator and heater core within.

Referring first to FIG. 1, a typical automotive heating and air conditioning assembly includes a hollow, rigid, molded plastic housing, indicated generally at 10, which is generally formed of two or more main sections that are screwed or snapped together. Upstream of the housing 10, a standard, non illustrated blower pulls air in and forces it downstream through housing 10. At the most downstream end of housing 10, within the vehicle interior, are a plurality (generally three) of air outlets, including a windshield defrost 12, mid level outlet 14, and lower or foot outlet 16. The air pulled in by the blower is selected by a suitable control valve, to be fresh, recirculated, or a combination of the two. Generally, recirculated interior air is chosen when a rapid heating or cooling is required. Likewise, the air outlet through which forced air exits to the interior is independently selected by any conventional control. What is most relevant to the subject invention is the control means by which the air pulled in to the system is tempered before it exits to the interior. Besides serving as a hollow plenum for the direction of forced air, several components are mounted within or on the housing 10. The most important of these to the subject invention are a conventional evaporator core 18, and a conventional heater core, indicated generally at 20. Evaporator core 18 is large enough in area to fill and otherwise block substantially the entire cross sectional or internal area of housing 10, so that all forced air entering will be forced to pass through it. Since evaporator core 18 can be deliberately turned on and off along with the compressor of the basic air conditioning system, its constant presence in the forced air flow presents no problem, apart from an inevitable slight pressure drop. Evaporator core 18 can even be activated in winter, to dry the air before it is heated by heater core 20. Located downstream of evaporator core 18, the standard heater core 20 is smaller in size, with an upstream face 22 generally opposed to the evaporator core 18, and a downstream face 24 generally opposed to the air outlets 12–16. Given its smaller area, heater core 20 leaves a bypass passage around the top (top from the perspective of FIG. 1), indicated at 26. Unlike evaporator core 18, heater core 20 is always active, which is to say that diverted engine coolant constantly circulates through it, even in summer. This, too, presents no problem, since the temperature control of the invention allows the effect of heater core 20 on the forced air to be essentially completely controlled. The temperature control valve that allows this more precise control of the effect of heater core 20 is described next.

Figures 2, 3:
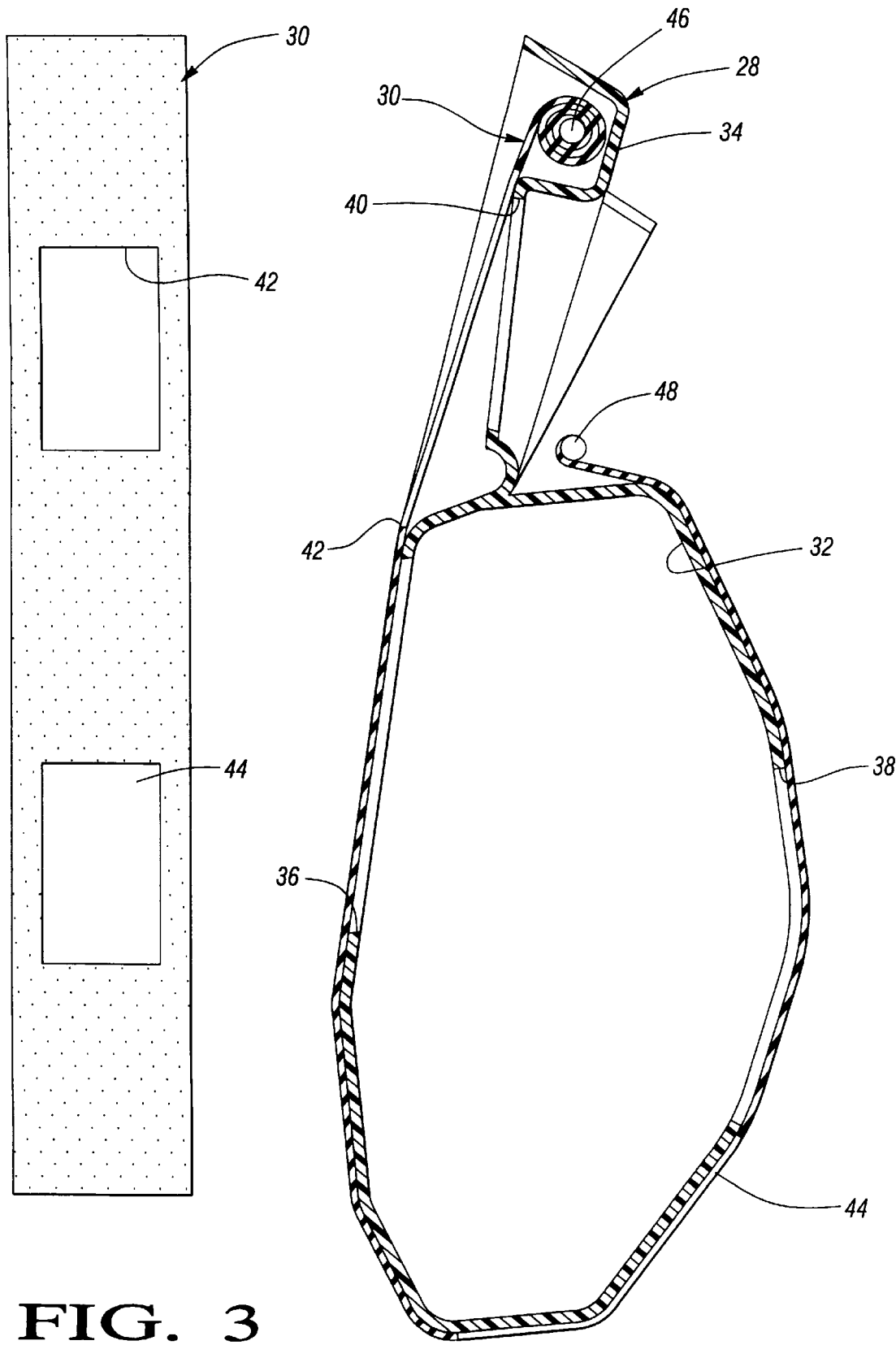
FIG. 2 is a side view of the slide in heater core module and belt, before installation of the heater core into the module or installation of the module into the housing.
FIG. 3 is a view of the flexible belt alone, rolled out.

Referring next to FIGS. 2 and 3, a heater core module, indicated generally at 28, is designed to both contain heater core 20, as well as to control air flow through it cooperation with a flexible belt, indicated generally at 30. Module 28 is a rigid plastic molding, which slide fits within housing 10 before housing 10 is closed. Module 28 has two basic sections, including a case 32 that holds heater core 20, and a partition wall 34 that bridges the bypass passage 26. Case 32 case has a pair of opposed openings, an upstream opening 36 facing the evaporator core 18, and a downstream opening 38 facing the air outlets 12–16, but is solid and uninterrupted otherwise. The case openings 36 and 38 are large enough to expose a substantial percentage of the area of the heater core faces 22 and 24 to air flow, but need not be large enough to expose all of the area of the heater core faces 22 and 24. Partition wall 34 has an opening 40 that takes up most of its width, so to open up most of the bypass passage 26 when it is unblocked. Belt 30 is formed of any suitably flexible and durable material (with limited stretch), such as Kevlar®, and has a pair of windows, an upper window 42 and lower window 44 separated by solid intervals of the belt 30. The end edges of belt 30 run from an upper roller 46 mounted above wall opening 40 to a lower roller 48 mounted above downstream heater case opening 38, so that belt 30 runs across wall opening 40 and closely around both side of case 32 and closely over both case openings 36 and 38. "Upper" and "lower," of course, imply only the reference frame of the Figures, and do not require such a vehicle orientation. The entire module 28, with core 20 and belt 30, can be assembled as shown in FIG. 2 and then conveniently installed into the larger housing 10. Heater core 20, of course, would thereafter be connected to inlet and outlet lines for engine coolant, which flow through it at all times that the engine is running. Belt 30 is configured, relative to the heater core module 28, so as to operate in a fashion described next.

Referring next to FIGS. 3 and 4, belt 30 is pulled back and forth around case 32 as at least one roller 46 or 48 is actively wound back and forth to take up and pay out one edge of belt 30. The other roller 48 or 46 may be simply spring biased to act as a take up roller for the other edge of belt 30, or it may be active as well, and coordinated so as to move in concert with the other active roller. The details of the electric motor(s) or other power source that would actually wind either roller 46 and 48, and the sensor(s) and control system that would determine the position of belt 30 at any point and feed that information back to the rollers 46 and 48 are not part of the subject invention. Such motors, sensors and control systems are known to those skilled in the art. The subject invention relates instead to the relationship of the various openings in the module 28 and belt 30 and how they can be coordinated, in response to pre-determined temperature selections made by an operator within the vehicle, so as to efficiently control the flow and temperature of the forced air within housing 10. More specifically, as shown in FIG. 4, the operator may select a so called "full cold" or maximum cooling mode, through the operation of conventional instrument panel controls. Although not separately illustrated, selecting for most rapid cooling would cause the air conditioning system controls to activate the compressor and evaporator core 18, and would also generally switch the air intake valve to re-circulated air. The forced air drawn into housing 10 downstream would all pass through the cold evaporator core 18, and be cooled. The ultimate downstream air outlet, which would be independently selected, would most likely be either outlet 14 or 16. The purpose of the invention is to assure that the forced air cooled by the evaporator core 18 is not thereafter reheated by the heater core 20, which would be counter productive. To that end, as seen in FIG. 4, the belt control system would, when the vehicle occupant selected maximum cooling mode would, wind the belt 30 up or down as necessary until it was sensed that the upper belt window 42 was fully aligned or registered with the wall opening 40. The bypass passage 26 for air around heater core 20 is thereby fully opened. At the same time, the relation of the total length of belt 30 to the circumference of case 32 and the relative location of the case openings 36 and 38 assures that solid intervals of the belt 30 closely overlay the case openings 36 and 38, while the lower belt window 44 concurrently overlies a solid portion of the case 32, between the case openings 36 and 38. Consequently, both heater core faces 22 and 24 are completely and closely covered and shut off from either direct or indirect air flow, and the forced air cooled by evaporator core 18 is not reheated before it reaches the selected air outlet 12–16.

Figure 5:
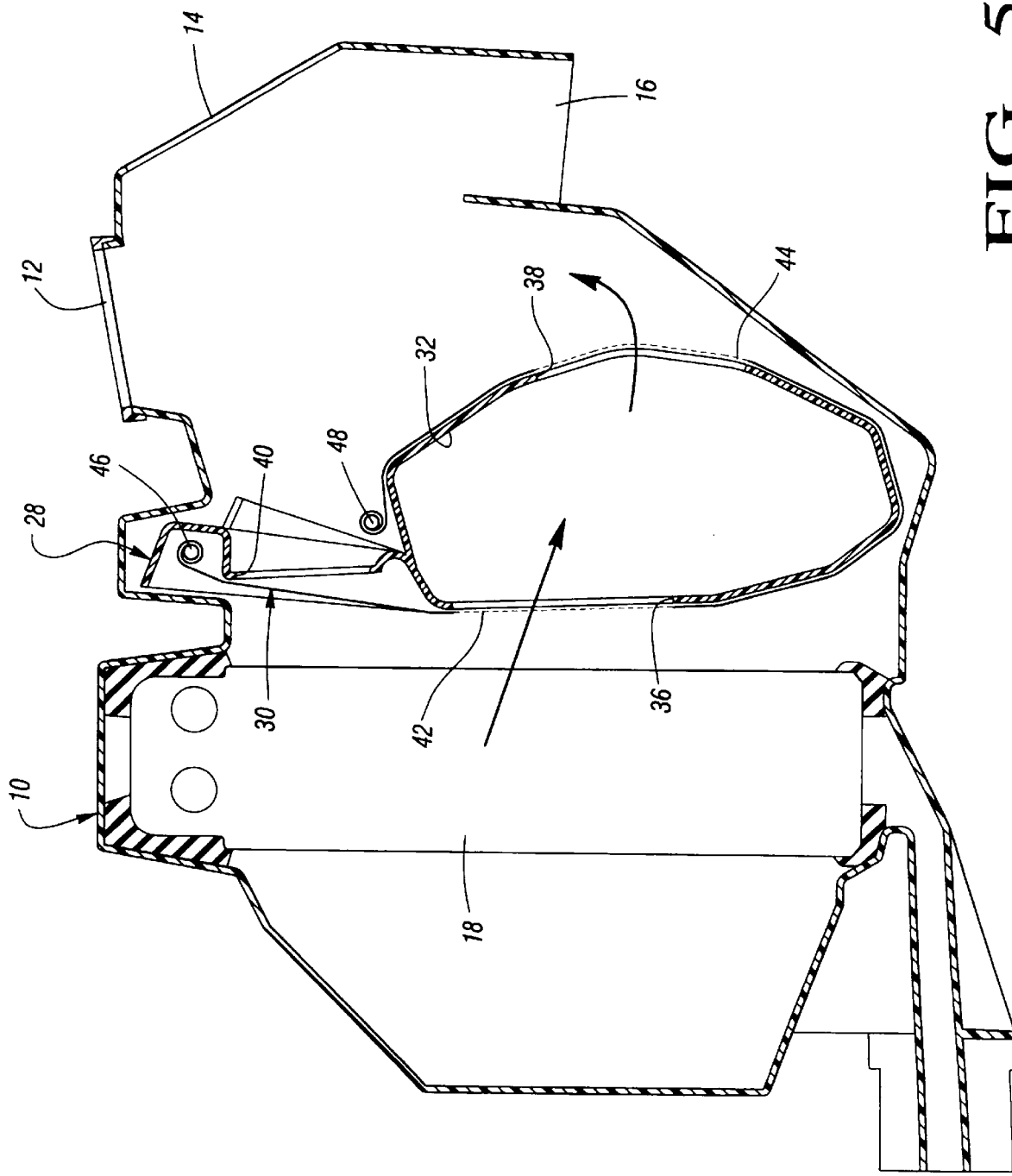
FIG. 5 is a view like FIG. 4, but showing the belt in full hot position.

Referring next to FIG. 5, the other "extreme" air tempering mode is so called full hot or maximum heating mode, where the converse air flow path is chosen. When the operator chooses maximum heating, evaporator core 18 would be deactivated by the control system, and, just as in full cold mode, recirculated air would likely be chosen, so as to speed the temperature change. Belt 30 is moved to a position where sensors indicate that a solid belt interval overlays the partition opening 40, while the belt openings 42 and 44 are fully aligned or registered with respective case openings 36 and 38. The bypass passage 26 is fully blocked, and the heater core faces 22 and 24 are fully exposed to forced air flow. All forced air passing through the deactivated evaporator core 18 is forced directly through the fully opened and always activated heater core 20, and ultimately out the independently selected air outlet 12–16. It should be kept in mind, however, that the belt position shown in FIG. 5 simply assures that the air coming through evaporator core 18 passes all through heater core 20, and none through the bypass passage 26. However, that position of belt 30, per se, does not necessarily require that evaporator core 18 be deactivated, although it normally would be, in winter. Even in winter, however, the evaporator core 18 might be turned on to dry out the forced air, through condensation, in which case it would be desired to reheat it by directing it through the heater core 20 before it reached outlet 12 and the windshield. And, most likely, it would be desired to reheat the air to the maximum extent, as the belt position shown in FIG. 5 would do. Nevertheless, belt positions between the two extremes of FIGS. 4 and 5 can be selected, so as to heat (or reheat) the air that has passed through the evaporator core 18 to a lesser extent, regardless of whether evaporator core 18 is active. This is described next.

Figure 6:
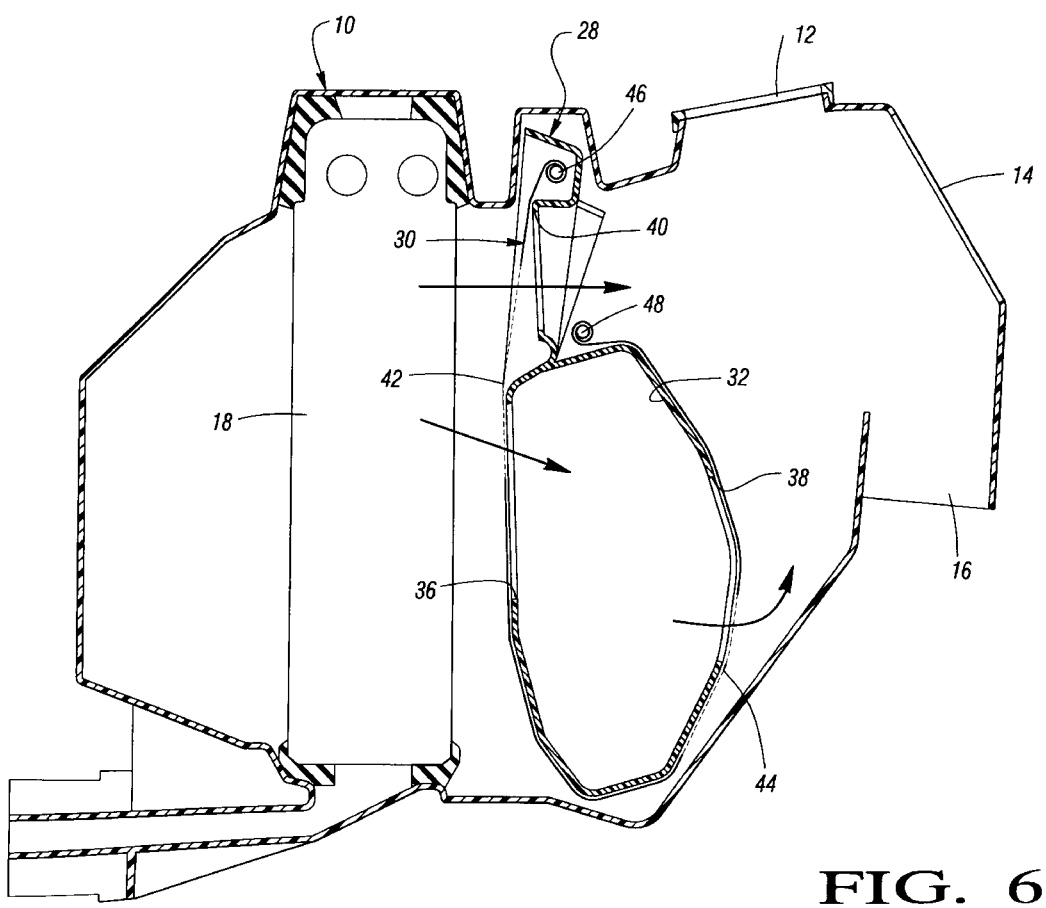
FIG. 6 is a view also like FIG. 5, but showing the belt in an intermediate position between the limit positions of FIGS. 4 and 5.

Referring next to FIG. 6, an intermediate mode between the two extremes could be selected by the vehicle occupant when it was desired to level off a previously selected rapid cooling or heating process, or to simply choose a less extreme air temperature in the first instance. For example, in winter, when the evaporator core 18 is normally deactivated, it might not be desired to heat the air as hot as the heater core 20 is capable when fully open. Conversely, in summer, an air temperature might be desired that was higher than what the fully active and always fully open evaporator core 18 would produce by itself. In any case, when a moderated or intermediate air temperature was desired, the operator would simply move a typical mechanical temperature control between the extreme cold and hot positions, as desired, or choose a specific desired interior temperature on a conventional electronic digital display. This would, in turn cause the rollers 46 and 48 to wind the belt 30 to any of an almost infinite number of intermediate positions, a possible one of which is shown in FIG. 6. In general, in any intermediate position, some of the forced air that has flowed already through the evaporator core 18, active or not, flows through the partition opening 40, without passing through the heater core 20, and some portion flows through the always active heater core 20, to be heated.

Referring next to FIGS. 4 and 6, and comparing them, the situation where it is desired to level off a rapid cooling process can be understood. From the rapid cooling position of FIG. 4, belt 30 is wound counterclockwise around case 32 to pull upper belt window 42 down by a certain increment (be it a half inch, one inch, or any given distance) and out of registration with partition opening 40 in substantially inverse proportion to the degree to which, concurrently, upper belt window 42 moves partially into registration with upstream case opening 36 and lower belt window 44 moves simultaneously off of a solid interval of case 32 and into partial registration with downstream case opening 38. Stated differently, the flow around heater core 20 is decreased by the same belt motion that increases the flow through the heater core 20. The greater the increment by which bypass passage 26 is closed off, the greater the increment by which the heater core faces 22 and 24 are concurrently opened up, and vice versa. Consequently, the cold air coming off of evaporator core 18 has a net re-heat that is a function of how much bypasses the heater core 20, and how much passes through heater core 20. And this net flow can be carefully and precisely controlled by the motion of belt 30 back and forth, onto and off of the rollers 46 and 48, across the partition 34 and around the case 32. It should be kept in mind that the FIG. 6 position of belt 30, also with an active evaporator core 18, could come into play even in winter, for defrosting the windshield. However, it is more likely that the FIG. 5 position of belt 30 would be preferred for defrost, since it would likely be desired to reheat the air coming off of evaporator core 18 to the maximum extent possible.

Referring next to FIGS. 5 and 6, and comparing them, a situation where it is desired to level off a rapid heating process can be understood. Evaporator core 18 would be off. From the belt position of FIG. 5, the rollers 46 and 48 wind the belt 30 clockwise, thereby moving the upper belt window 42 up and out of complete registration with upstream case opening 36 while simultaneously moving lower belt window 44 down and out of complete registration with downstream case opening 38, to the same degree. Concurrently, the partition opening 40 is opened up by upper belt window 42 moving upwardly and away from upstream case opening 36. The partition opening 40 is opened up to a degree inverse to the degree that the case openings 36 and 38 are blocked off. Therefore, less air will flow through the heater core 20, and proportionately more will flow through the bypass passage 26. Again, any other intermediate belt position similar to that shown that in FIG. 6, but with the three openings 36, 38 and 40 opened and closed to different degrees, could be achieved. It should also be kept in mind that any such intermediate belt position might be selected initially, and not just as a pull back from one of the belt limit positions of FIGS. 4 or 5.

Variations in the preferred embodiment could be made. The bypass passage 26 could be located on the other side (or "bottom") of the heater core 20, or the heater core 20 could be placed more or less in the center of housing 10, leaving a smaller bypass passage to either side. The module 28 could theoretically be eliminated as a separate part, and separate rollers mounted directly to the housing 10 could be used to run the belt 30 over the same path, directly across the bypass passage 26 and directly wrapped around the heater core 20. The belt windows 42 and 44 would likely have to be sized differently, however, because the lack of a case like 32 surrounding the heater core 20 would preclude the ability, as shown in FIG. 4, to have the lower belt window 44 "parked" over a solid part of the case 32 and, therefore, not creating an opening through the core 20. Furthermore, having the separately assembled unit of module 28, core 20 and belt 30 that can be slid at once inside of housing 10 is a convenience, and allowing the belt 30 to slide over the outer surface of case 32 helps to support the smooth motion of the belt 30 and eliminates the needs for some other guide surfaces or rollers. It is also convenient to be able to fix the rollers 46 and 48 to the module 28, although they, too, could be mounted directly within the housing 10 itself. Therefore, it will be understood that it is not intended to limit the invention to just the preferred embodiment disclosed.

We claim:

1. An automotive heating and air conditioning assembly with improved temperature control, comprising:

a hollow housing through which forced air flows;

at least one forced air outlet;

an evaporator core inside of said housing, upstream of said air outlet through which substantially all forced air flows;

a heater core located in said housing between said evaporator core and said housing air outlet, said heater core sized so as to fill less than the entire internal area of said housing, thereby leaving a bypass opening passage around said heater core, said heater core having an upstream core face oriented generally toward said evaporator core and an opposed downstream core face oriented generally toward said air outlet; and, a flexible, retractable and extensible belt within said case housing running across said bypass passage and wrapping closely around and across both of said core faces, said belt having a plurality of windows and solid intervals sized and relatively located so as to closely cover both heater core faces and open said bypass passage in a first belt position, so as to block said bypass passage and uncover both heater core faces in a second belt position, and so as to incrementally unblock said bypass passage while simultaneously and proportionately covering said heater core faces, in inverse proportion, at belt positions intermediate said first and second belt positions, whereby, in said first belt position, forced air flowing through said evaporator core subsequently flows only through said bypass passage before reaching said air outlet, blocked from contact with both heater core faces, and in said second belt position, forced air flowing through said evaporator flows straight through both of said heater core faces without flowing through said bypass passage, and in intermediate belt positions, forced air flowing through said evaporator flows through said bypass passage and through said heater core faces in inverse proportion.

2. An automotive heating and air conditioning assembly with improved temperature control, comprising:

a hollow housing through which forced air flows;

at least one forced air outlet;

an evaporator core inside of said housing, upstream of said air outlet, and sized to fill substantially the entire internal area of said housing, so that forced air always passes through said evaporator core;

a heater core module located within said housing between said evaporator core and said housing air outlet, said heater core module having a heater core case sized to fill less than the entire internal area of said housing and having an upstream case opening oriented generally toward said evaporator core and a downstream case opening oriented generally toward said air outlet, said heater core module also having a blocking partition oriented across the remainder of said housing internal area not taken up by said heater core case with a bypass opening in said blocking partition;

a heater core located in said heater core case; and, a flexible, retractable and extensible belt within said housing running across said blocking partition and wrapping closely around substantially said heater core case and closely across both of said heater core case openings, said belt having a plurality of windows and solid intervals sized and relatively located so as to closely cover both heater core case openings and open said bypass opening in a first belt position, so as to cover said bypass opening and uncover both heater core case openings in a second belt position, and so as to incrementally cover said bypass opening while simultaneously and proportionately uncovering said heater core case openings, in inverse proportion, at belt positions intermediate said first and second belt positions, whereby, in said first belt position, forced air flowing through said evaporator subsequently flows only through said bypass opening before reaching said air outlet, blocked from flowing through either of said heater core case openings, and in said second belt position, forced air flowing through said evaporator core flows directly through both of said heater core case openings and through said heater core without flowing through said bypass opening, and in intermediate belt positions, forced air flowing through said evaporator flows through both said bypass opening and said heater core case openings in inverse proportion.

3. An automotive heating and air conditioning assembly with improved temperature control, comprising:

a hollow housing through which forced air flows;

at least one forced air outlet;

an evaporator core inside of said housing, upstream of said air outlet, and sized to fill substantially the entire internal area of said housing, so that forced air always passes through said evaporator core;

a heater core module located within said housing between said evaporator core and said housing air outlet, said heater core module having a heater core case sized to fill less than the entire internal area of said housing and having an upstream case opening oriented generally toward said evaporator core and a downstream case opening oriented generally toward said air outlet, said heater core module also having a blocking partition oriented across the remainder of said housing internal area not taken up by said heater core case with a bypass opening in said blocking partition;

a heater core located in said heater core case; and, a flexible, retractable and extensible belt mounted on said heater core module and extending from one reel above said bypass opening to another reel above said downstream case opening so as to run across said blocking partition and wrap closely across both of said heater core case openings, said belt having a plurality of windows and solid intervals sized and relatively located so as to closely cover both heater core case openings and open said bypass opening in a first belt position, so as to cover said bypass opening and uncover both heater core case openings in a second belt position, and so as to incrementally cover said bypass opening while simultaneously and proportionately uncovering said heater core case openings, in inverse proportion, at belt positions intermediate said first and second belt positions, whereby, in said first belt position, forced air flowing through said evaporator subsequently flows only through said bypass opening before reaching said air outlet, blocked from flowing through either of said heater core case openings, and in said second belt position, forced air flowing through said evaporator core flows straight through both of said heater core case openings and through said heater without flowing through said bypass opening, and in intermediate belt positions, forced air flowing through said evaporator core flows through both said bypass opening and said heater core case openings in inverse proportion.

* * * * *